US006101616A

United States Patent [19]
Joubert et al.

[11] Patent Number: 6,101,616
[45] Date of Patent: Aug. 8, 2000

[54] DATA PROCESSING MACHINE NETWORK ARCHITECTURE

[75] Inventors: Philippe Joubert, Cesson-Sévigné; Thierry Leconte, Betton; Bruno Rochat, Pacé, all of France

[73] Assignee: Bull S.A., Louveciennes, France

[21] Appl. No.: 08/887,254

[22] Filed: Jul. 2, 1997

[30] Foreign Application Priority Data

Mar. 27, 1997 [FR] France ................... 97 03778

[51] Int. Cl.⁷ ............................ G06F 11/16; G06F 15/16
[52] U.S. Cl. ............................. 714/11; 709/105
[58] Field of Search ..................... 714/4, 10, 11, 714/102, 104, 105; 709/6, 201, 205, 217–221, 226

[56] References Cited

U.S. PATENT DOCUMENTS

| | | | |
|---|---|---|---|
| 4,891,810 | 1/1990 | de Corlieu et al. ................ | 714/11 |
| 5,155,729 | 10/1992 | Rysko et al. ..................... | 714/11 |
| 5,423,024 | 6/1995 | Cheung .......................... | 714/11 |
| 5,774,660 | 6/1998 | Brendel et al. ................... | 709/6 X |
| 5,867,706 | 2/1999 | Martin et al. .................... | 709/6 |

FOREIGN PATENT DOCUMENTS

| | | |
|---|---|---|
| 0865180 | 9/1998 | European Pat. Off. . |
| WO 9618149 | 6/1996 | WIPO . |

*Primary Examiner*—Thomas M. Heckler
*Attorney, Agent, or Firm*—Miles & Stockbridge P.C.; Edward J. Kondracki

[57] ABSTRACT

The invention relates to data processing machine network architecture and more particularly relates to the load balancing of data servers. A data server (3) is constituted by at least two server data processing machines (1, 2) capable of providing the same services. The server data processing machines (1, 2) have the same physical address MAC0 to which the same network protocol address is assigned in order to establish connections of client machines to the server (3), which is considered as a single virtual machine. Each server data processing machine comprises filtering means so that each connection of a client machine (5, 6, 7, 8, 9, 10) to the virtual machine corresponds to a unique connection effective with one and only one server data processing machine (1 or 2). The filtering means of each server data processing machine (1, 2) take into account at least one indicator of the status of each server data processing machine (1, 2) having the same physical address MAC0.

7 Claims, 6 Drawing Sheets

DATA PROCESSING MACHINE NETWORK ARCHITECTURE

BACKGROUND OF THE INVENTION

1. Field of the Invention

The invention concerns a data processing machine network architecture and more particularly relates to the load balancing of data servers. In the absence of a specific term, data processing machine is intended herein to mean a physically constituted machine such as, for example, a computer.

2. Description of the Related Art

A data processing server makes it possible to offer a set of services to users using client machines connected to the server by means of networks whose interconnection constitutes a wide area network (WAN). An increasing number of users makes it possible to reduce the costs of developing the services offered by dividing these costs among the various users. However, this increasing number of users makes it necessary to increase the load-carrying capacity of the server. On the other hand, in order to satisfy the users, the server must offer a certain reliability in the provision of these services, for example in terms of fault tolerances.

While a server constituted by one data processing machine makes it possible to provide an initial work load carrying capacity, providing there is no failure of this machine, it is possible to obtain a certain reliability by adding a second data processing machine which is available to act as a backup to the initial machine in case of a failure of the initial machine. The initial machine in turn becomes available as a backup machine after its repair.

The prior art offers various solutions for using a backup machine to take over for a malfunctioning machine, such as active replications or passive replications of executable applications in these machines in order to provide the services requested within the limits of the given work load. However, the use of a second machine makes it necessary to consequently increase the hardware investment, which inevitably has repercussions on the costs of the services offered, while the backup machine remains unused in the absence of any failures of the initial machine.

While a server constituted by one data processing machine makes it possible to provide an initial work load carrying capacity, it is possible to increase this initial load-carrying capacity by adding a second data processing machine and balancing the work load between the initial machine and the second machine, which function simultaneously.

In order to obtain a certain reliability of the server with increased load-carrying capacity, a backup machine could be added to each machine sharing the new load-carrying capacity. This would present the drawback of multiplying the hardware investment cost by four. One solution for limiting the resulting hardware investment increase is to add only two machines to the initial machines, a first machine for increasing the load-carrying capacity and a second machine for serving as a backup in case of a failure of the initial machine or the first machine for increasing the load-carrying capacity.

The addition of these two machines in order to constitute a server thus makes it possible to increase its capacity and to obtain a certain reliability of the server.

It is known that each data processing machine connected to a local area network (LAN) has a physical address which makes it possible to physically distinguish it within this local area network. This physical address is known in the literature as a MAC (English abbreviation for Medium Access Control) address. This address essentially needs to be known by the protocol belonging to the local area network which sends data packets of a message destined for a specific machine in question. Each local area network has its own protocol, of the type known as Ethernet, Token Ring or another protocol, adapted to its hardware configuration. The exchange of messages with machines in other remote local area networks connected by means of a wide area network (WAN) requires a higher protocol layer which identifies each machine by means of an address such as, for example, that commonly referred to in the literature as an IP address, IP meaning inter-network protocol generally and Internet Protocol, when referring to the global network known as the Internet. The following explanations refer to the IP protocol layer, but they could be re-transcribed to refer to other protocol layers of the same level such as, for example, DECNET or SNA. This makes it possible to dispense with the disparity in the protocols and hardware configurations of the local area networks. The knowledge of the IP address of a machine is therefore sufficient to identify this machine in the wide area network. A router comprises a translation table which makes it possible to correspond an IP address with a MAC address for each machine belonging to the local area network it manages. The machines directly connected to the same local area network could communicate by means of their MAC addresses. However, in order to render transparent to the application layers the fact that the machines belong to the local area network or to the wide area network, it is preferable to have them communicate by means of their IP addresses in the local area network. Each machine therefore comprises a translation table similar to that of the router in the local area network. Several different IP addresses can correspond to the same MAC address, making it possible to see the same physical machine as several distinct virtual machines. On the other hand, the reverse is not true, since if several MAC addresses were to correspond to the same IP address, in the end the router would not know to which physical machine to send a data packet.

In order to embody a server by means of three data processing machines as previously desired, the possibility is available to one skilled in the art to assign to the address of each machine MAC1, MAC2, MAC3, an address IP1, IP2, IP3 in the router which manages a local area network to which these three machines belong. By authorizing a sub-system of client machines in the wide area network to access the server using the address IP1, and an additional sub-system to access the server using the address IP2, one skilled in the art can effect a load balancing in the two machines constituting the server with the addresses MAC1 and MAC2. The machine with the address MAC3 then remains available as a backup machine. If, for example, the machine with the address MAC2 has a fault, it suffices to assign the address IP2 to the machine 3 and in the router, to correspond the address IP2 with the address MAC3, while naturally taking the necessary precautions involved in switching from the machine with the address MAC2 to the machine with the address MAC3.

The solutions that can be envisaged from the general knowledge of one skilled in the art, however, have the drawback of requiring a hardware investment in two additional machines in order to simultaneously fulfill the need for an increase in load-carrying capacity and the need for reliability.

SUMMARY OF THE INVENTION

A first object of the invention is to simultaneously obtain the increase in load-carrying capacity and the reliability of a data processing server by adding only one machine in order to constitute this server, thus making it possible to produce a savings in the costs incurred in the development of this server.

The invention is therefore composed of a network architecture comprising a data server constituted by an initial data processing machine to which is added an additional data processing machine, characterized in that it comprises means for balancing the work load of this server between the initial machine and the additional machine, and means for redirecting the work load of either machine to the other machine when one of these two machines malfunctions.

Thus, the new capacity provided by a single additional machine is fully usable in the absence of a fault in the machines of the server and reverts to its initial capacity only for the time required to make the malfunctioning machine operational again.

An additional advantage provided by the invention is to make it possible to increase the load-carrying capacity of a server with a reliability beyond that offered by two machines, by means of successive iterations of the teaching described above.

The invention is therefore composed of a network architecture comprising a data server constituted by an initial data processing machine, to which are added n additional data processing machines, n being a whole number greater than or equal to 1, characterized in that in each machine, there are means used to balance the work load of this server between these machines, and means used to redirect the work load of one of the number n+1 of machines thus constituted to one or more of the machines remaining available when one of these n+1 machines is malfunctioning.

As seen above, one possible way to effect a load balancing or inclusively a load redirection among various machines in the network comprising the data server, is to create a priori various subsystems of client machines in the wide area network, each subsystem being connected to a distinct machine which constitutes the server. An equitable sharing of the resources offered by the machines of the server to the various subsystems of client machines requires the best possible anticipation of the load on the server created by these various subsystems. Any failure of one of the machines constituting the server has repercussions on the state of the router, which must consequently modify its tables for translating Internet Protocol IP addresses into MAC addresses. On the other hand, this type of load balancing is frozen and is not controlled by the server machines since it depends on the client machines.

Greater flexibility would be obtained if all the client machines could see all of the machines which constitute the server as a single virtual machine, accessible by means of a single IP address called an IPV address, indicating a virtual correspondence. The problem, therefore, is to correspond different MAC addresses with this same IPV address. It is possible to insert, between client machines and server machines, an application layer which executes a translation of an IPV address into various IPP addresses as a function of software load balancing criteria, each IPP address designating one of the server machines.

However, the solution suggested has certain drawbacks. The IPV to IPP translation requires an additional operation which inevitably affects the access times to the various machines of the server. On the other hand, the application which executes the IPV to IPP translation requires a machine in order to run. A specialized router having functionalities for running this application could be used, but this solution is not possible with a router that does not have these functionalities. Running this application on one of the machines of the server increases the access time to the end machine by the intermediate transit time of a packet to be transmitted in the machine running the abovementioned application, before it reaches the end machine. An additional drawback arises if the machine which is running this application is malfunctioning. It is then necessary to transfer the running of the application to another machine. This runs the risk of interfering with the accessibility of the server.

A particular object of the invention is to render transparent to the client machines of a computerized data server the load balancing between various machines which constitute this server, no matter what changes in load-carrying capacity are offered by these various machines of the server, and without requiring any additional layer to be added to the existing network protocol layers if the server is constituted by only one machine.

The invention is therefore composed of a network architecture comprising a data server constituted by more than one server data processing machine, characterized in that at least two server data processing machines have the same physical address MAC, a network protocol address IPV is assigned to this physical address MAC so as to establish connections of client machines with a single virtual machine, each server data processing machine comprises filtering means so that each connection of a client machine with this virtual machine corresponds to a unique connection effective with one and only one server data processing machine, these filtering means of each server data processing machine take into account at least one indicator of the status of each server data processing machine having the same physical address MAC.

Thus, the network and transport layers do not physically distinguish the server data processing machines, which are seen virtually, up to the physical layer of the links, as a single data processing machine. In order to be physically differentiated from the other machines that are physically addressed in identical fashion, each physical machine determines its own adaptability to rendering a link effective as a function of the status of the data processing machines having the same address.

The invention is particularly useful in a process for establishing at least one connection (IPC, NPC, IPV, NPS) of a port NPC of a client machine having an inter-network protocol address IPC to a port NPS of a server having an inter-network protocol address IPV constituted by at least two data processing machines having the same physical address MAC0. The process comprises a step for rendering effective the connection (IPC, NPC, IPV, NPS) to a single data processing machine with the address MAC0 as a function of a criterion on the value IPC or NPC determined by the data processing machine with the address MAC0 to which the connection is effective and as a function of the status of the other machines with the address MAC0.

An additional advantage is obtained when the filtering means ensure that no break in connection is made in case of a programmed shutdown or startup of a server machine. For this purpose, the process comprises a transient step at the change of state of a machine with the address MAC0 in which re-initialization packets, sent upon detection of information packets which do not correspond to an effective connection, are not transmitted from the network layer to the physical layer. The transient step is followed by a steady-state step when a sufficiently long predetermined time elapses without sending of re-initialization packets which do not correspond an effective connection are transmitted from the network layer to the physical layer i.e., the re-initialization packets are suppressed.

BRIEF DESCRIPTION OF THE DRAWINGS

A preferred mode of implementation of the invention, described in reference to the following figures, allows the invention and the teaching resulting from it to be more clearly understood.

DESCRIPTION OF THE PREFERRED EMBODIMENTS

Figure 1:
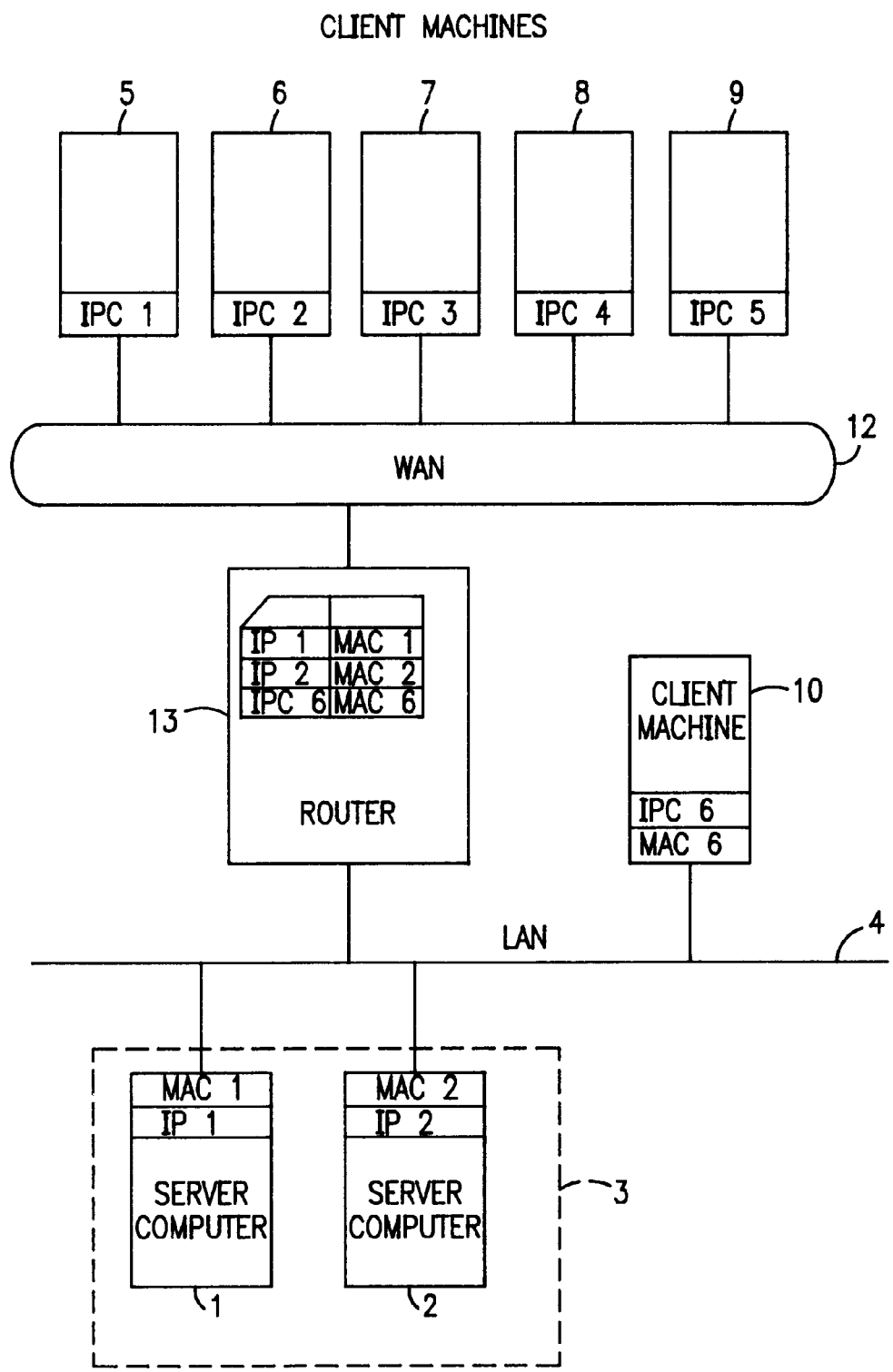
FIG. 1 shows an architecture with a server constituted by two data processing machines, each of which has a distinct physical address.

In FIG. 1, a server 3 of computerized data is constituted by two data processing machines 1 and 2 connected to a local area network 4. Each of the machines 1 and 2 is equipped with a network card with respective addresses MAC1 and MAC2 which make it possible to distinguish each of the machines at the level of the physical layer of the local area network 4.

Thus, a client machine 10 connected to the local area network 4 can send data packets to the machine 1 or the machine 2, respectively, by placing in the header of a packet the value of the address MAC1 or the value of the address MAC2, respectively. The client machine 10 being equipped with a network card with an address MAC6, the machines 1 and 2 can send data packets to the machine 10 by placing in the header of a packet the value of the address MAC6.

The client machines 5 through 9 are not connected directly to the local area network 4 and do not know a priori the MAC addresses of the machines 1 and 2 which belong to the physical constitution of the local area network 4.

Thus, a layer higher than the physical layer described above is defined so that the machines 5 through 9 can establish connections with the machines 1 and 2 by means of a wide area network 12. This higher layer, known as the network layer, assigns each machine 1, 2, 5, 6, 7, 8, 9, 10, respectively, an address IP1, IP2, IPC1, IPC2, IPC3, IPC4, IPC5, IPC6 so as to distinguish each of the machines in the wide area network 12 independently from the physical connections which link these machines.

A router 13 is intended to produce a correlation between the network layer and the physical layer 4. For this purpose, it has an address translation table which associates the address MAC1, MAC2, MAC6 of the physical layer with each inter-network protocol address IP1, IP2, IPC6 of a machine 1, 2, 10 directly connected to the local area network 4.

Thus, when a data packet appears with an IP address in its header related to a machine of the local area network 4, the router 13 consults its translation table to determine the MAC address which corresponds to the destination IP address. It places the address thus determined into the header of the data packet. In this way, the destination machine of the data packet receives it through its network card when it sees this data packet passing through the local network 4. The translation table is filled using the protocol ARP.

The client machine 5 can establish a connection with, for example, the machine 1, by means of the IP addresses via the router 13. The following explanations are also valid for the machine 2.

The machine 1 offers access to various services, each of which is identified by a server port number NPS. In order to access one of these services, the client machine 5 establishes a connection with the machine 1. This connection is identified by means of a quadruplet (IPC1, NPC, IP1, NPS) in which NPC is a client port number which allows the machine 5 to recognize the access request to which the established connection corresponds. The client machine generates the numbers NPC according to an algorithm of its own, very often by choosing them from a list of available successive numbers.

In the quadruplet (IPC1, NPC, IP1, NPS), the values IPC1 and IP1 allow the router 13 to physically establish the connection between the machine 1 and the machine 5 by means of the addresses MAC1 and the physical links in the wide area network (WAN) 12.

The mechanism explained above is valid for the client machines 6 through 9 in the wide area network 12 and for the machine 10 in the local area network 4 which, having its own address translation table, does not pass its packets through the router 13.

All the machines of the server 3 are able to provide all the services of the server 3, each service being identified by a port NPS. To effect a load sharing of the connections with the machines 1 and 2 of the server 3, it suffices to request the machines 5, 7 and 9, for example, to establish connections with the address IP2.

If the machine 2 malfunctions, it is possible at that time to assign both the addresses IP2 and IP1 to the machine 1. Using the protocol ARP, the router 13 modifies its translation table and the address IP2 corresponds to the address MAC1. Thus, the malfunction of the machine 2 remains transparent to the client machines which continue to establish connections with the addresses IP1 and IP2 which are permitted to them. When the machine 2 again becomes functional, the router 13 uses the protocol ARP in order to revert to the initial translation table in which the addresses IP2 and IP1 correspond to the addresses MAC2 and MAC1, respectively.

The mechanism explained above applies symmetrically if the machine 1 malfunctions.

During the first startup of an additional machine for constituting the server 3, it is necessary to inform the client machines of a new load sharing in order to equilibrate the load among the various machines which constitute the server 3. A manager of the server 3 defines a new subsystem of client machines which it requests be connected to the new server machine. The load sharing remains subject to the decisions of the client machines to effectively connect themselves to the additional server machine, which the manager of the server 3 does not really control. On the other hand, the malfunction of a machine only goes as far as the router 13 and therefore remains transparent in the wide area network 12.

An additional advantage of the invention is obtained by the addressing of all the machines constituting the server 3 by means of only one IPV address in the wide area network 12, as will now be explained in reference to FIG. 2 for two machines.

Each of the machines 1 and 2 is equipped with a network card with the same address MAC0. Thus, this common address MAC0 does not make it possible to distinguish each of the machines at the level of the physical layer in the local area network 4.

The client machines establish connections with the server 3 by means of a single inter-network protocol address called IPV since the server 3 is seen virtually as a single machine, even though it is constituted by two different data processing machines 1 and 2.

It is possible to assign several inter-network protocol addresses IP to the same physical address MAC. The machine 1 therefore has an Internet Protocol address IP1 for reserving itself non-shared connections, at the level of the network layer, with the machine 2. Likewise, the machine 2 has an inter-network protocol address IP2 for reserving itself non-shared connections, at the level of the network layer, with the machine 1. The address translation table of the router 13 corresponds the three addresses IP1, IP2 and IPV with the same physical address MAC0.

No matter which address IP1, IP2 or IPV appears in the header of a packet flowing through the local area network 4, this packet is physically received by both machines 1 and 2 since the translation table directs it to the physical address MAC0 common to both machines.

The reception of a packet addressed by means of the address IPV does not pose any problem since each of the two machines 1 and 2 recognizes that the address IPV actually corresponds to the address MAC0 of which it is the holder. However, the packets are received in both machines. It must be noted in this case that the reception of a packet addressed by means of the address IP1 by the machine 2, or respectively of a packet addressed by means of the address IP2 by the machine 1, runs the risk of causing a fault emitted by the machine 2, or respectively emitted by the machine 1, since the address IP1, or respectively the address IP2, does not correspond to the address MAC0 in the machine 2, or respectively in the machine 1.

It is important to prevent the emission of the above-mentioned fault in order not to interfere with the connections.

It is possible to filter the data packets not destined for a machine at the input of this machine. In this case, it is necessary for the machine 1, or respectively the machine 2, to detect in the header of the data packet, the address IP2, or respectively the address IP1, before the passage of the data packet from the physical layer to the network layer. It will be seen in the following description that the teaching of the invention can extend to more than two machines; it is therefore necessary to filter, in a given machine, the data packets for all the IP addresses held by the other machines with the same address MAC0, which are not held by the given machine.

It is also possible to filter the emission of a fault (ICMP redirect) generated by the incompatibility of an IP address with the address MAC0 of a given machine, at the output of this machine.

While the reception by all the machines of a packet addressed using the address IPV does not pose any problem, it is necessary, however, to be careful of the fact that all the machines receiving this packet can tend to send data packets in response to the packet received. If the data packets in response to the packet received are identical for all the machines, this does not pose any additional problem since the higher level protocols such as TCP are equipped in a standard way to manage the loss and the duplication of data packets.

If the data packets in response to the packet received are different for at least two machines, it poses the problem of knowing which packets are valid.

This problem is solved by providing each of the machines 1, 2 with filtering means so that each connection defined by a quadruplet (IPC, NPC, IPV, NPS) is only effective with one of the machines constituting the server 3.

Figure 3:
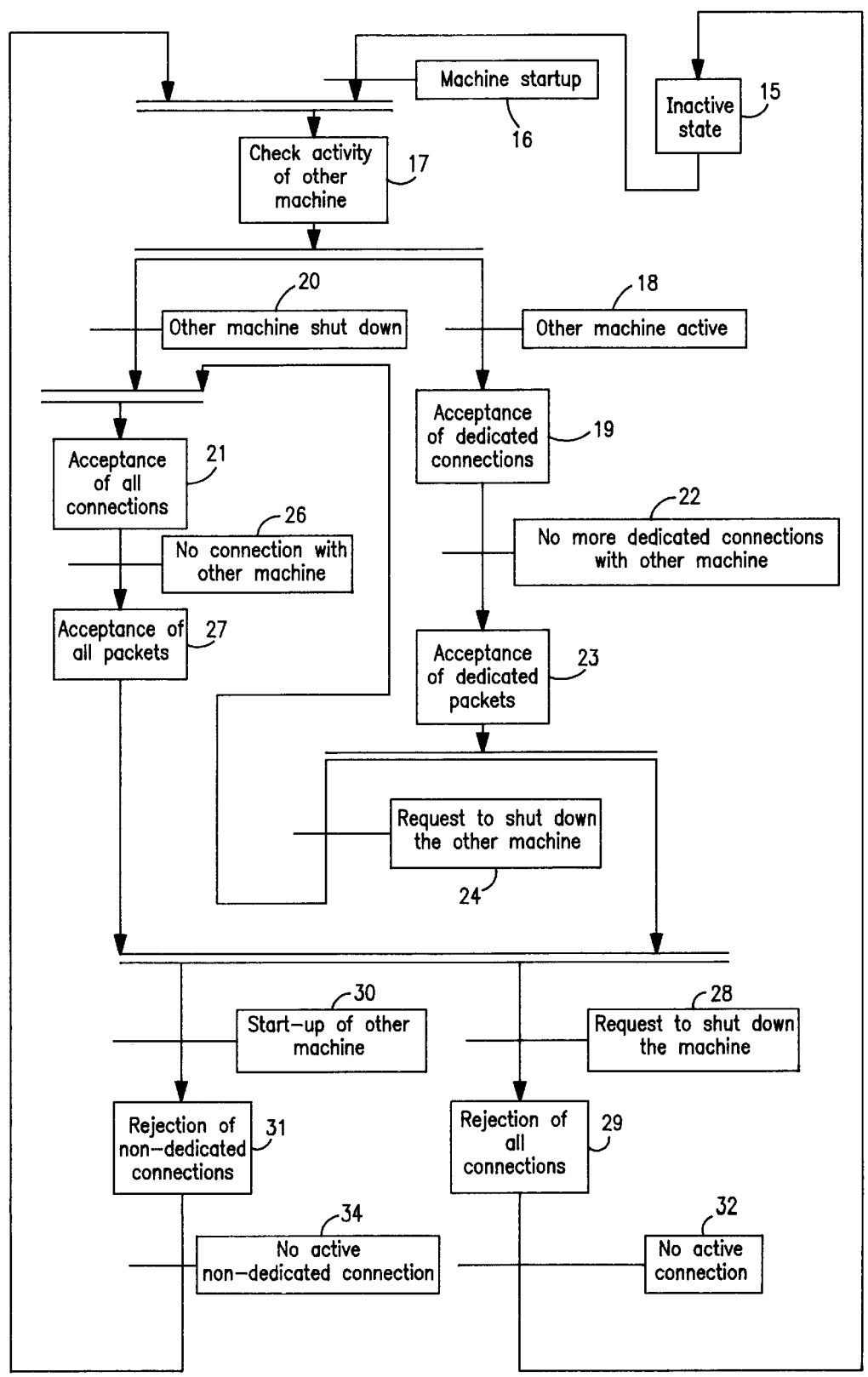
FIG. 3 shows an example of filtering means for two machines having the same physical address.

FIG. 3 shows a preferred example of filtering means to be implemented.

These filtering means are described with the aid of a graph of the states of each machine 1, 2 and are implemented by means of a software program executed in each machine 1, 2.

The following conventions are used to read this graph. A downward arrow moves the state of the machine from one step to the next if the transition, represented by a horizontal line which intersects this arrow, is valid. A double horizontal line represents an inclusive-OR operation for taking into account preceding steps or activating subsequent steps. A single horizontal line at which several arrows arrive, or from which several arrows depart, represents a logical multiply for taking into account more than one preceding step or activating more than one subsequent step.

The step 15 represents the inactive state of the machine, which essentially means that the machine is neither receiving nor sending any data packet through the local area network 4.

The transition 16 starts up the machine in order to place it in a state which corresponds to the activation of the step 17, and until the machine returns to the state of the step 15, it sends data packets through the local area network 4 at regular intervals to indicate that it is in an active state, that is, capable of accepting connections. These data packets are, for example, addressed to all the machines which constitute the server 3, by means of the address IPV and are characteristic of the machine which sends them. Until the machine in question returns to the state of the step 15, it receives the packets characteristic of the states of each of the machines constituting the server 3. If the machine in question detects that the other machine is active, the transition 18 activates the step 19. If the machine in question detects that the other machine is inactive, the transition 20 activates the step 21.

In step 19, the machine in question accepts any new connection of the type (IPC, NPC, IPV, NPS) which is dedicated to it until deactivation in the step 23. various possibilities are available for dedicating a connection to the machine in question. For example, the connections with odd NPCs are dedicated to the machine 1 and the connections with even NPCs are dedicated to the machine 2.

The same client machine can be served by the machine 1 or the machine 2; if the client machine increments its number NPC at each connection, it is then served alternately by the machine 1 and the machine 2. It is also possible to dedicate the connections with odd IPCs to the machine 1 and those with even IPCs to the machine 2, in which case the same client machine is served systematically by the machine 1 or systematically by the machine 2.

The choice concerning an inter-network protocol address IPC or a port number NPC of a client machine constitutes a deterministic criterion for dedicating a connection to a single server machine among those constituting the server 3.

Beginning with the step 17, the machine in question receives all the data packets physically addressed to the address MAC0. Beginning with the step 19, the machine in question filters the packets in which either the address IPC or the port number NPC belong connections which are not dedicated to it. This means that the machine in question does not receive these packets at the level of the network layer. It can, for example, continually free up the storage space which these packets come to occupy.

However, in step 19, the machine in question no longer receives all the packets in which either the address IPC or the port number NPC belong to connections which are normally dedicated to it. In effect, it may be that some of these packets are linked to connections established with the other machine before the machine in question reaches the step 19. The machine in question then receives only the packets linked to a connection established with it. The machine in question interprets the received packets not that are linked to an established connection as an error, and consequently sends a connection re-initialization packet.

As seen above, the re-initialization packets are filtered on output, that is, they are not transmitted to the physical communication layer. These packets are in fact diverted so as to reset a clock counter in which the reaching of a predetermined threshold is interpreted as a null probability of receiving data packets that are not linked to an established connection with the machine in question. The transition 22 then activates the step 23.

In step 23, the machine in question receives all the dedicated packets. The re-initialization packets, upon detection of received packets not linked to an established connection, are no longer filtered on output, which means that the reliability check on the compatibility of the packets received with the connections established, is again operational. The machine in question continues to accept the establishment of new dedicated connections. As soon as the step 19 is activated, a counter CPTD, not represented, is incremented by each establishment of a dedicated connection and decremented by each breaking of a dedicated connection.

At a request to shut down the other machine, the transition 24 activates the step 21. At a request to shut down the machine in question, the transition 28 activates the step 29.

In step 21, the machine in question accepts any new connection, dedicated or non-dedicated. A counter CPTND, not represented, is incremented by each establishment of a non-dedicated connection and decremented by each breaking of a non-dedicated connection.

In step 21, the machine in question no longer necessarily receives all the packets. In effect, it may be that some of these packets are linked to connections established with the other machine before the machine in question reaches the step 21. The machine in question then receives only the packets linked to a connection established with it. The machine in question interprets the received packets that are not linked to an established connection as an error, and consequently sends a connection re-initialization packet.

In order to avoid indicating errors wrongly, the re-initialization packets are not transmitted to the physical communication layer but are diverted to a clock counter which functions like a timeout by regularly incrementing itself over time. At each detection of the sending of a re-initialization packet, the counter is reset to zero. Thus, the reaching of a predetermined threshold indicates that no re-initialization packet has been sent during the time linked to this predetermined threshold. This is interpreted as the absence of any established connections with the other machine. The transition 26 then activates the step 27.

In step 27, the machine in question receives all the packets, dedicated or non-dedicated. The re-initialization packets, upon detection of received packets that are not linked to an established connection, are no longer filtered on output, which means that the reliability check on the compatibility of the packets received with the connections established, is again operational. The machine in question continues to accept the establishment of any new connection, dedicated or non-dedicated. At a request to shut down the machine in question, the transition 28 activates the step 29. At the startup of the other machine, the transition 30 activates the step 31.

At the transition 28, the machine in question informs the other machine of its shutdown request.

In step 29, the machine in question rejects the establishment of any new connection and filters any packet other than a packet linked to a previously established connection. As soon as all the packets linked to a connection have been received or sent, this connection is broken. This then decrements the counter CPTD or the counter CPTND.

The counters CPTD and CPTND at zero indicate that no further connection is active in the machine in question. The transition 32 then returns the machine to the state of the step 15.

In step 31, the machine in question rejects the establishment of any new non-dedicated connection and filters any non-dedicated packet other than a packet linked to a previously established connection. As soon as all the packets linked to a non-dedicated connection have been received or sent, this connection is broken. This decrements the counter CPTND.

The counter CPTND at zero indicates that no further non-dedicated connection is active in the machine in question. The transition 34, and then the transitions 18 and 22, return the machine in question to the state of the step 23.

Figure 2:
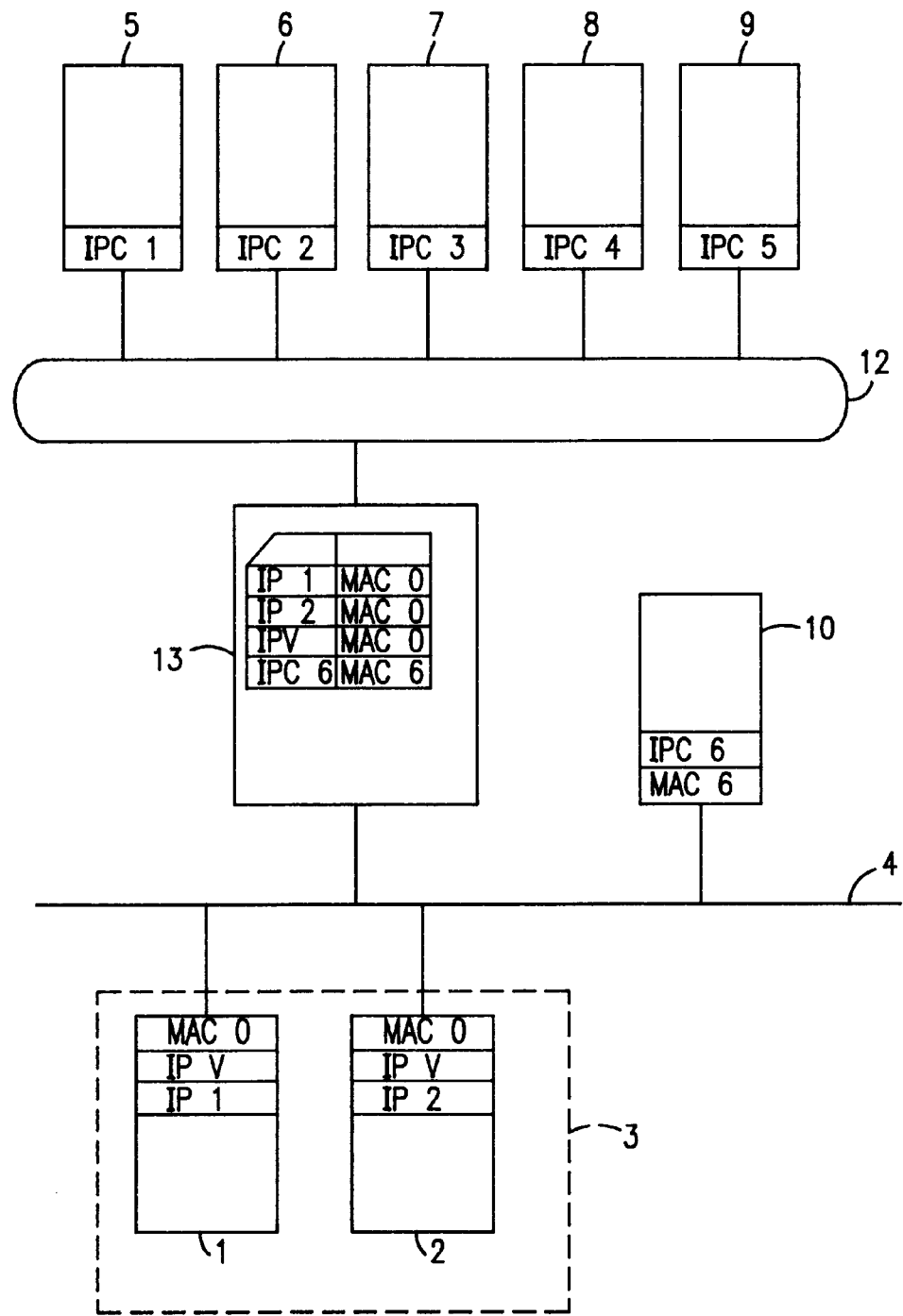
FIG. 2 shows an architecture with a server constituted by two physically distinct data processing machines having the same physical address.

Referring to FIG. 2, neither the client machines 5 through 9 nor the router 13 have knowledge of the state of the machines 1 and 2.

If the connections (IPC1, NPC, IPV, NPS), (IPC3, NPC, IPV, NPS), (IPC5, NPC, IPV, NPS) are dedicated to the machine 1, the connections will be processed by the machine 1 when it is in the step 23, and by the machine 2 when the machine 1 is in the step 15 with the machine 2 in the step 27.

If the connections (IPC2, NPC, IPV, NPS), (IPC4, NPC, IPV, NPS) are dedicated to the machine 2, the connections will be processed by the machine 2 when it is in the step 23, and by the machine 1 when the machine 2 is in the step 15 with the machine 1 in the step 27.

Thus it may be seen that each of the machines 1 and 2, in step 23 of its respective status graph creates a load sharing of the connections. The machine 1 in the step 27 with the machine 2 in the step 15 fulfills the backup function of the machine 2 by the machine 1. Likewise, the machine 2 in the step 27 with the machine 1 in step 15 fulfills the backup function of the machine 1 by the machine 2.

The machine 1 in the step 19 and the machine 2 in the step 31 correspond to a transient state which precedes the load sharing. The machine 1 in the step 29 and the machine 2 in the step 21 correspond to a transient state which precedes the backup of the machine 1 by the machine 2.

It is also possible to ensure that when one of the client machines 5 through 9 establishes a connection with the server 3 by means of the address IPV, a connection with a client port having an even NPC is dedicated to the machine 2 and a connection with a client port having an odd NPC is dedicated to the machine 1. The explanations above remain valid.

Figure 4:
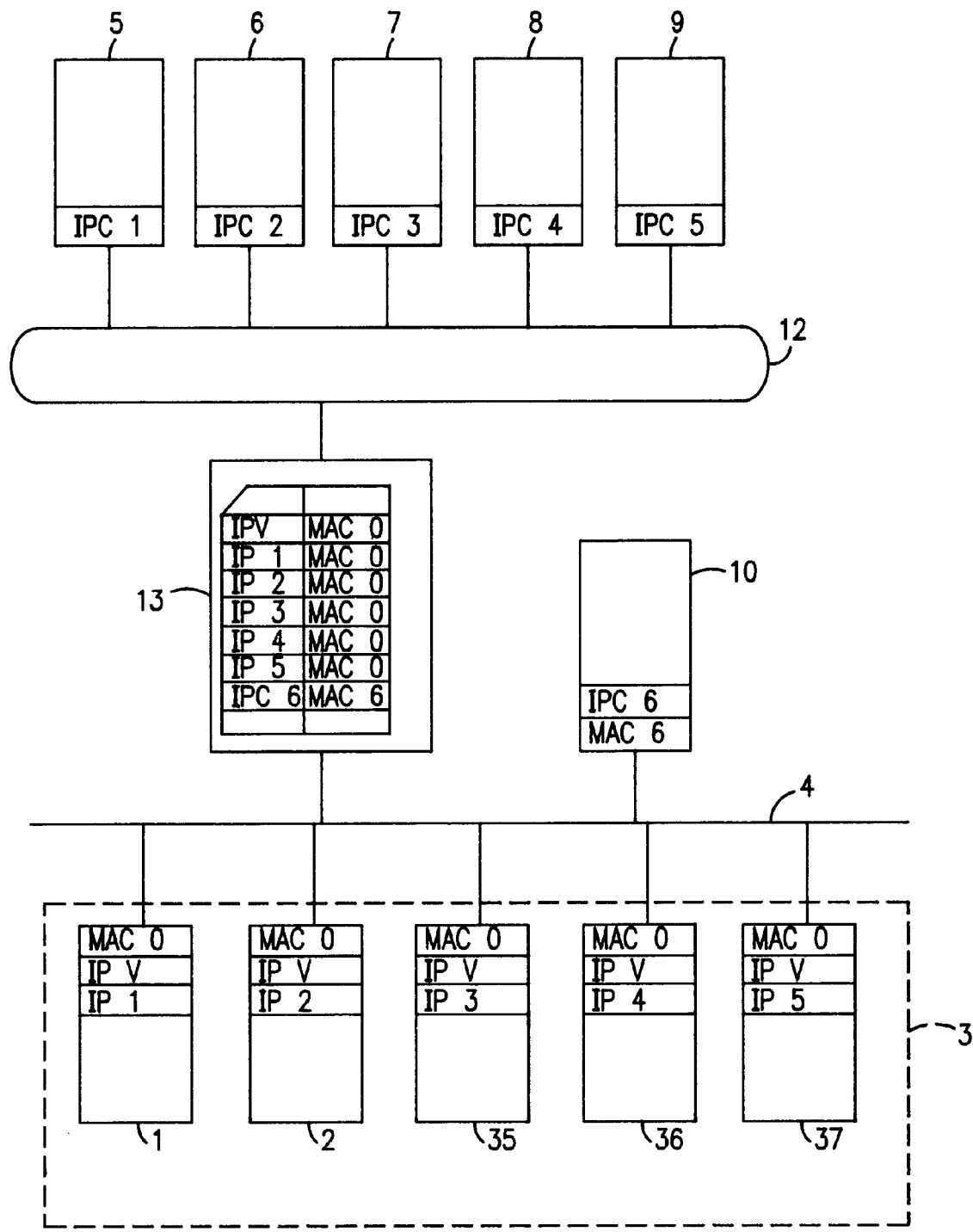
FIG. 4 shows an architecture with a server constituted by more than two physically distinct data processing machines having the same physical address.

In FIG. 4, the server 3 is constituted by n data processing machines 1, 2, 35, 36, 37. In this case n=5; however, the following explanations remain valid for any number of machines.

A plurality of client machines 5 through 10 establish connections with the server 3 through the wide area network 12, by means of the router 13. Since each of the client machines 5 through 10 is identified by the router 13 by means of an Internet Protocol address IPC1 through IPC6, it is not important for the machines 8, 9 and to be physically connected to the local area network 4.

In order to send a request to the server 3 and receive a response from it, a client machine 5 establishes a connection with a data processing machine of the server. An essential advantage of the invention is the ability to establish connections with any machine of the server 3 by means of a single inter-network protocol address IPV common to all the machines of the server 3. All the machines of the server 3 are able to provide all the services of the server 3, each service being identified by a port NPS. In order to send a request and receive a response in one of its ports NPC, the machine 5 establishes a connection identifiable by a quadruplet (IPC5, NPC, IPV, NPS).

However, the connection (IPC5, NPC, IPV, NPS) is physically established with a single machine of the server 3 by means of a filtering function implemented in each machine.

Figure 5:
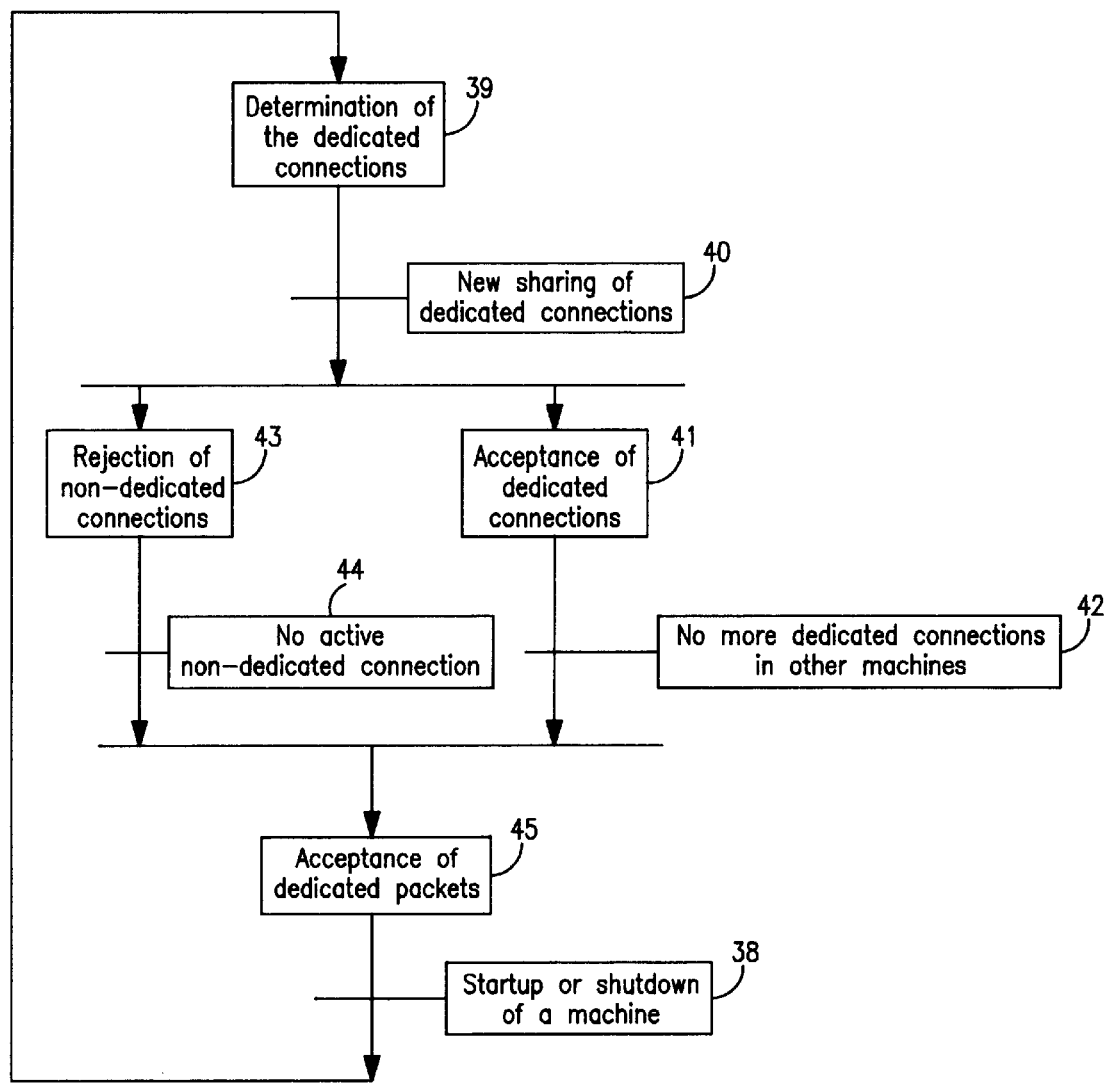
FIG. 5 shows an example of filtering means for more than two machines having the same physical address.

FIG. 5 shows a preferred example of filtering means to be implemented.

Consider one of the machines 1, 2, 35, 36, 37 in which the filtering function is implemented.

At the startup of the machine in question, the transition 38 places the machine in the state of the step 39 in which the connections dedicated to this machine are determined.

Beginning with the step 39, the machine in question communicates its state to the other machines by regularly sending status packets similar to those described in reference to FIG. 3. The status packets sent by the other machines of the server 3 make it possible to determine a number k of active machines.

The determination of the dedicated connections can be made from addresses IPC or port numbers NPC. The following explanations of an example of determination from port numbers NPC are valid for a determination from client machine addresses IPC.

The dedicated connections are determined as being those in which the remainder of the division by k is equal to a number J, which is itself determined by the machine in question.

If a number J was determined before modification of the number k by a startup or shutdown of a machine of the server 3, and this number J is lower than the actual number k, the latter remains unchanged. Otherwise, the number J is considered to be equal to the number k.

The pair (J, k) having thus defined a new sharing of dedicated connections, the transition 40 activates the step 41 and the step 43.

In the step 41, the machine in question accepts any new connection dedicated to it and filters the others. With each new connection which occurs, the machine in question divides the port number NPC of this connection by k and compares the remainder of the division to the number J. If the remainder of the division is equal to the number J, the connection is accepted.

In the step 41, the data packets accepted are those linked to a new dedicated connection accepted after having passed through the transition 40. As explained above, the machine in question sends re-initialization packets when it receives data packets sensed to be linked to a dedicated connection but for which no established connection exists in the machine in question because the connection for these data packets was established in another machine before the passage through the transition 40. These re-initialization packets are not transmitted to the physical layer, but are used to reset a timeout. When the timeout has elapsed, no further dedicated connections are considered to exist in the other machines and the transition 42 is valid.

In the step 43, the machine rejects any new non-dedicated connection. However, there may be existing non-dedicated connections established with the machine in question before the passage through the transition 40. These connections are made compatible in a counter that is decremented at each breaking of one of these connections. The movement of the counter to zero validates the transition 44.

Before passing through the transition 44, the machine in question receives data packets linked to non-dedicated connections. For the data packets linked to a non-dedicated connection which is not established with the machine in question, the machine in question sends re-initialization packets filtered on output, that is, not transmitted to the physical layer of the local area network 4.

The passage through the transitions 42 and 44 activates the step 45.

In the step 45, no further non-dedicated connections with the machine in question exist, and no further dedicated connections with the other machines exist. All the dedicated packets received are normally linked to a connection established with the machine in question. The re-initialization packets are no longer filtered on output.

At any moment, the shutdown or startup of a machine constituting the server 3 validates the transition 38 in order to reactivate the step 39. If the shutdown is that of the machine in question, no connection will be dedicated to it.

Figure 6:
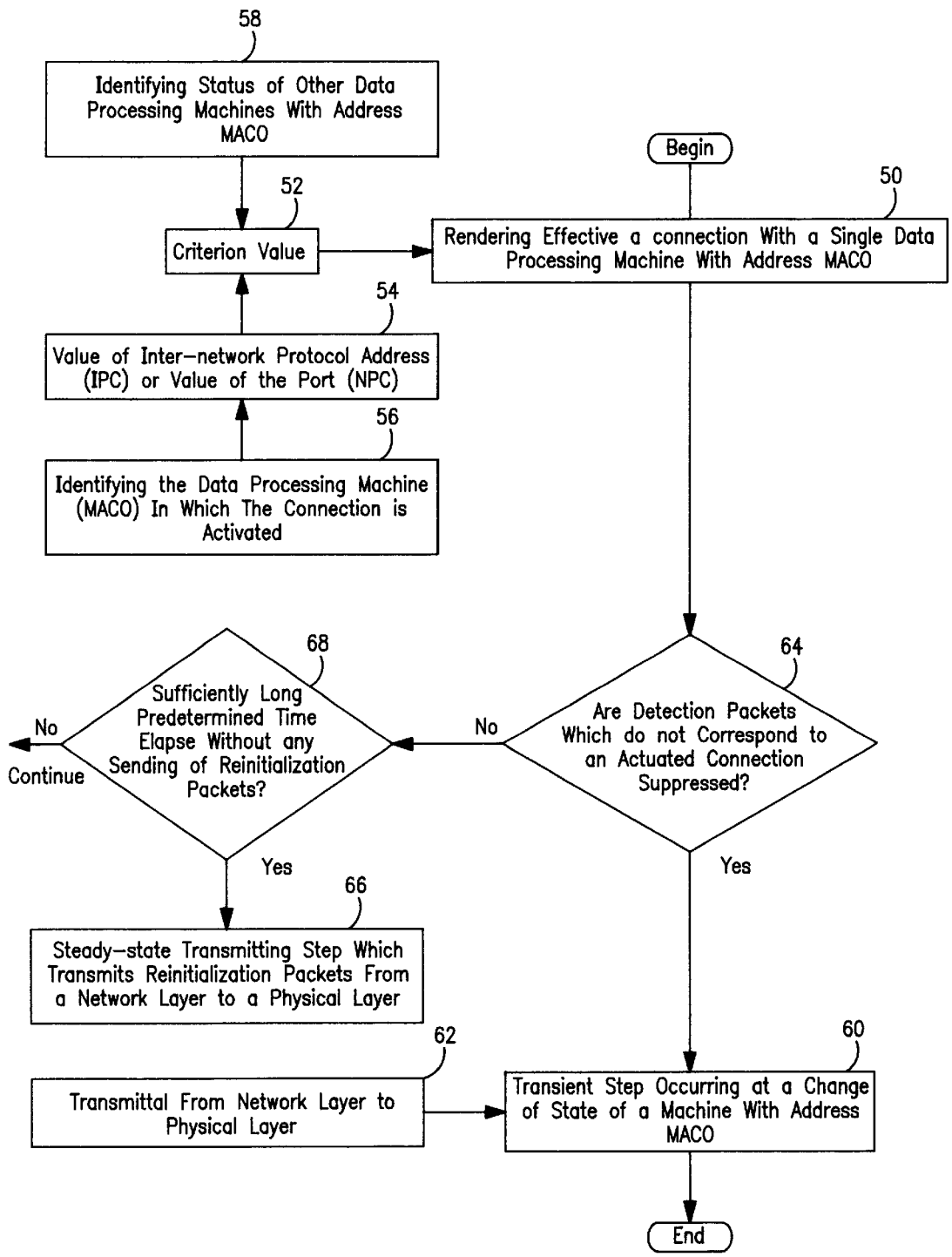
FIG. 6 shows a flow diagram of a process for establishing at least one connection of a client machine.

FIG. 6 is a flow diagram showing the process for establishing at least one connection (IPC, NPC, IPV, NPS) of a client machine port (NPC) with an inter-network protocol address (IPC) to a server port (NPS) of a server (3) with an inter-net protocol address (IPV) constituted by at least two data processing machines having the same physical address (MAC0). The process of the present invention includes a step 50 for actuating a connection (IPC, NPC, IPV, NPS) with a single data processing machine having address (MAC0) as a function of a criterion value 52, which includes the value 54 of the inter-network protocol address (IPC) or the port (NPC), wherein the value of the inter-network protocol address (IPC) or the port (NPC) is determined by an identifying step 56 in which the data processing machine with the address (MAC0) in which the connection is actuated is identified and as a function of the status identifying step 58, which identifies the status of the other machines with the address (MAC0).

The process further comprises a transient step 60 at the change of state of a machine with the address (MAC0) in which re-initialization packets may be transmitted from a network layer to a physical layer a transmitting step 62 upon determination by a determining step 64 that information packets which do not correspond to an actuated connection are suppressed, and therefore are not transmitted from a network layer to a physical layer.

The process further comprises a steady-state transmitting step 66 which follows transient step 60 when a sufficiently long predetermined time elapses, as determined by determining step 68. without any sending of re-initialization packets, wherein in steady-state transmitting step 66, the re-initialization packets sent upon detection of packets which do not correspond to an effective connection are transmitted from a network layer to a physical layer.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A network architecture for establishing connections of client machines comprising:

a network, a data server (3) having a first data processing machine (1) and n additional data processing machines (2, 35, 36, 37), connected to said network, n being a whole number greater than or equal to one, wherein the data server (3) has a work load and comprises at least two data processing machines (1, 2) of said first and n additional data processing machines (1, 2, 35, 36, 37) having the same physical address MAC0, said first data processing machine and n additional data processing machines (1, 2, 35, 36, 37) including means for balancing the work load of said server (3) among said first and n additional data processing machines (1, 2, 35, 36, 37) and said first data processing machine and said n additional data processing machine including means for redirecting the work load of one of the machines (n+1) to one or more of the machines remaining available when one of said n+1 machines is malfunctioning, and a network protocol address IPV assigned to said physical address MAC0 so as to establish connections of the client machines with the data server (3) viewed as a single machine.

2. The network architecture according to claim 1 wherein a network protocol address IPV is assigned to said physical address MAC0 so as to establish connections of client machines with a single virtual machine, each server data processing machine comprises filtering means operatively connected to said network so that each connection of a client machine (5, 6, 7, 8, 9, 10) with said virtual machine corresponds to a unique connection effective with one and only one server data processing machine (1 or 2), and said filtering means of each server data processing machine (1, 2) operatively responds to at least one indicator of the status of each server data processing machine (1, 2) having the same physical address MAC0.

3. The network architecture according to claim 2, wherein said filtering means include a connection (IPC, NPC, IPV, NPS) dedicated to a single server machine using a deterministic criterion including the value of a network protocol address IPC of each client machine.

4. The network architecture according to claim 2, characterized in that said filtering means includes a connection (IPC, NPC, IPV, NPS) dedicated to a single server machine using a deterministic criterion including the value of the ports NPC of the client machines.

5. A process for establishing a t least one connection (IPC, NPC, IPV, NPS) of a client machine port (NPC) with an inter-network protocol address (IPC) to a server port (NPS) of a server (3) with an inter-net protocol address(IPV) constituted by at least two data processing machines having the same physical address MAC0, said process comprising:

actuating a connection (IPC, NPC, IPV, NPS) with a single data processing machine with the address MAC0 by performing the steps of:

checking (17) in said single data processing machine a status of another data processing machine with the address MAC0, accepting in said single data processing machine dedicated connections (19) according to a criterion value being determined in said single data processing machine, said criterion value being a function of the status (18) of said an other machine.

6. The establishing at least one connection (IPC, NPC, IPV, NPS) according to claim 12 wherein re-initialization packets may be transmitted from a network layer to a physical layer upon detection of information packets which do not correspond to an actuated connection, and the step of actuating a connection (IPC, NPC, IPV, NPS) includes:

a transient step occurring at a change of state of a machine with the address (MAC0) in which transmittal of said re-initialization packets is suppressed.

7. A process for establishing at least one connection (IPC, NPC, IPV, NPS) according to claim 13 wherein the step of actuating a connection (IPC, NPC, IPV, NPS) further includes:

a transient step in which a predetermined time elapses without sending re-initialization packets;

a steady-state step which follows said transient step upon detection of packets which do not correspond to an actuated connection during said steady-state step, re-initialization packets are transmitted from a network layer to a physical layer.

* * * * *

UNITED STATES PATENT AND TRADEMARK OFFICE
CERTIFICATE OF CORRECTION

PATENT NO. : 6,101,616
DATED : August 8, 2000
INVENTOR(S) : Joubert et al.

It is certified that error appears in the above-identified patent and that said Letters Patent is hereby corrected as shown below:

Claims:
Column 14, claim 6,
Line 34, after "The" and before "establishing" insert -- process for --
Line 35, "claim 12" should read -- claim 5 --

Column 14, claim 7,
Line 44, "claim 13" should read -- claim 6 --

Signed and Sealed this

Ninth Day of October, 2001

Attest:

NICHOLAS P. GODICI
Attesting Officer
Acting Director of the United States Patent and Trademark Office